US010913323B2

(12) United States Patent
Pacella et al.

(10) Patent No.: US 10,913,323 B2
(45) Date of Patent: Feb. 9, 2021

(54) VEHICLE DEFROSTER DUCT

(71) Applicant: Mahindra N.A. Tech Center, Auburn Hills, MI (US)

(72) Inventors: John P. Pacella, Rochester Hills, MI (US); Richard Haas, Ferndale, MI (US); Kevin D. Bargon, Livonia, MI (US); Lowell F. Kiester, Jr., Grand Blanc, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 96 days.

(21) Appl. No.: 16/252,993

(22) Filed: Jan. 21, 2019

(65) Prior Publication Data
US 2020/0231019 A1    Jul. 23, 2020

(51) Int. Cl.
*B60H 1/00* (2006.01)
*B60K 37/00* (2006.01)

(52) U.S. Cl.
CPC ..... *B60H 1/00271* (2013.01); *B60H 1/00207* (2013.01); *B60K 37/00* (2013.01); *B60H 2001/00214* (2013.01)

(58) Field of Classification Search
CPC ............ B60H 1/00271; B60H 1/00207; B60H 2001/00214; B60H 2001/00228; B60H 1/00295; B60H 1/3414; B60K 37/00
(Continued)

(56) References Cited

U.S. PATENT DOCUMENTS

| | | | |
|---|---|---|---|
| 6,168,230 B1 | 1/2001 | Ono | |
| 2010/0035533 A1* | 2/2010 | Dubief | B60H 1/242 454/127 |

(Continued)

FOREIGN PATENT DOCUMENTS

| | | |
|---|---|---|
| JP | 2010052677 A | 3/2010 |
| KR | 20030027283 A | 4/2003 |
| KR | 20050109782 A | 11/2005 |

OTHER PUBLICATIONS

International Search Report from related PCT application No. PCT/US2020/013437 dated May 11, 2020.
(Continued)

*Primary Examiner* — Edelmira Bosques
*Assistant Examiner* — Ryan L Faulkner
(74) *Attorney, Agent, or Firm* — Harness, Dickey & Pierce, P.L.C.

(57) ABSTRACT

A heater duct can be coupled to an instrument panel of a vehicle, and comprises a base, a nozzle, and a neck. The base is sealingly coupled to the instrument panel and includes an inlet opening to receive air from a heater. The nozzle includes an outlet opening and is fluidly connected to the base. The nozzle deflects the air through the outlet opening and toward a predetermined region of a windshield. The neck extends between and is sealingly coupled to the base and nozzle. The base, nozzle, and neck cooperate to at least partially define an interior volume. The heater duct is positioned in an orthogonal coordinate system comprising an x-axis, a y-axis, and a z-axis. Air flowing from the inlet opening through the interior volume toward the outlet opening follows a path sequentially extending in substantially a negative z-direction, substantially a negative y-direction, and substantially a positive z-direction.

18 Claims, 5 Drawing Sheets

(58) Field of Classification Search
USPC .......................................... 454/95, 127, 154
See application file for complete search history.

(56) References Cited

U.S. PATENT DOCUMENTS

2016/0137034 A1* 5/2016 Sano .................... B60H 1/3442
454/154
2018/0370322 A1* 12/2018 Filipkowski ......... B60H 1/0055

OTHER PUBLICATIONS

Written Opinion issued in related PCT application No. PCT/US2020/013437 dated May 11, 2020.

* cited by examiner

VEHICLE DEFROSTER DUCT

FIELD

The present disclosure relates to a defroster duct for a vehicle.

BACKGROUND

This section provides background information related to the present disclosure which is not necessarily prior art.

Some vehicles are equipped with heating, ventilation, and cooling ("HVAC") systems. HVAC systems may use heat generated by an engine to heat air that can be passed into a passenger cabin of the vehicle. The HVAC system may include ducts to transport the heated air. The heated air may be delivered to the passenger cabin by one or more vents. The vents can direct the air toward passengers and/or windows (i.e., to defrost or defog the windows).

The ducts are generally hidden from view so that they are not visible from within the passenger cabin. The hidden ducts may present packaging and assembly challenges that have associated costs. It may be beneficial to provide a heater duct that may be easily fitted to a vehicle instrument panel after the instrument panel is assembled to the vehicle.

SUMMARY

This section provides a general summary of the disclosure, and is not a comprehensive disclosure of its full scope or all of its features.

The present disclosure provides a heater duct adapted to be coupled to an instrument panel of a vehicle. The heater duct comprises a base, a nozzle, and a neck. The base includes an inlet opening. The inlet opening is adapted to receive air from a heater. The base is adapted to be sealingly coupled to the instrument panel. The nozzle includes an outlet opening. The nozzle is fluidly connected to the base. The nozzle is adapted to deflect the air through the outlet opening and toward a predetermined region of a windshield. The neck extends between the base and the nozzle. The neck is sealingly coupled to the base and the nozzle. The base, the nozzle, and the neck cooperate to at least partially define an interior volume. The heater duct is positioned in an orthogonal coordinate system comprising an x-axis, a y-axis, and a z-axis. Air flowing from the inlet opening through the interior volume and toward the outlet opening follows a path sequentially extending in substantially a negative z-direction, substantially a negative y-direction, and substantially a positive z-direction.

In some configurations, the nozzle is tapered between a first dimension adjacent to the neck and a second dimension adjacent to the outlet opening. The second dimension is greater than the first dimension.

In some configurations, the base further includes a vent opening. The vent opening is adapted to receive at least a portion of the air.

In some configurations, the vent opening comprises a pair of diametrically opposed vent openings.

In some configurations, the neck includes a main portion and a connecting portion. The main portion has a main axis extending therethrough. The connecting portion has a connecting axis extending therethrough. The main axis and the connecting axis extend nonparallel to one another.

In some configurations, the base axis extends through a center of the inlet opening. The base axis is offset from the main axis in a positive x-direction.

In some configurations, the main portion is disposed downstream of the connecting portion.

In some configurations, the nozzle is bilaterally asymmetric.

In some configurations, at least a portion of the base is disposed in the negative z-direction with respect to the instrument panel. At least a portion of the neck is disposed in the negative y-direction with respect to the instrument panel.

In some configurations, the heater duct is adapted to be removably coupled to the instrument panel.

In some configurations, the base is adapted to be removably coupled to the instrument panel by hook and loop fastener.

In some configurations, the base, the nozzle, and the neck are integrally formed.

In some configurations, the base, the nozzle, and the neck share a common wall. The common wall has a substantially uniform thickness. The substantially uniform thickness is greater than or equal to about 2 mm to less than or equal to about 3 mm. The common wall comprises acrylonitrile butadiene styrene.

In some configurations, the y-axis is adapted to extend parallel to a direction of forward travel of the vehicle. The z-axis is adapted to extend perpendicular to a surface upon which the vehicle is adapted to travel.

In some configurations, the path continues along the positive z-direction and a positive y-direction.

The present disclosure also provides another heater duct assembly. The heater duct assembly is adapted to be coupled to an instrument panel of the vehicle. The heater duct comprises a duct and a vent. The duct includes a base, a nozzle, and a neck. The base includes an inlet opening adapted to receive air from a heater. The base is adapted to be sealingly coupled to the instrument panel. The nozzle includes an outlet opening. The nozzle is fluidly connected to the base. The nozzle is adapted to deflect the air through the outlet opening and toward a predetermined region of a windshield. The neck extends between the base and the nozzle. The neck is sealingly coupled to the base and the nozzle. The base, the nozzle, and the neck cooperate to at least partially define an interior volume. The vent is disposed within a vent opening. The vent is coupled to the base. The vent is disposed downstream of the inlet opening. The vent is adapted to receive at least a portion of the air. The nozzle is disposed downstream of the vent.

In some configurations, the vent is adapted to be moved between a fully-open configuration and a fully-closed configuration. In the fully-open configuration, the vent receives at least a portion of the air. In the fully-closed configuration, the nozzle receives substantially all of the air.

In some configurations, the vent is continuously adjustable between the fully-open configuration and the fully-closed configuration.

In some configurations, the vent comprises a pair of diametrically opposed vents.

In some configurations, a position of the vent is adjustable to control a flow direction of the at least a portion of the air.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
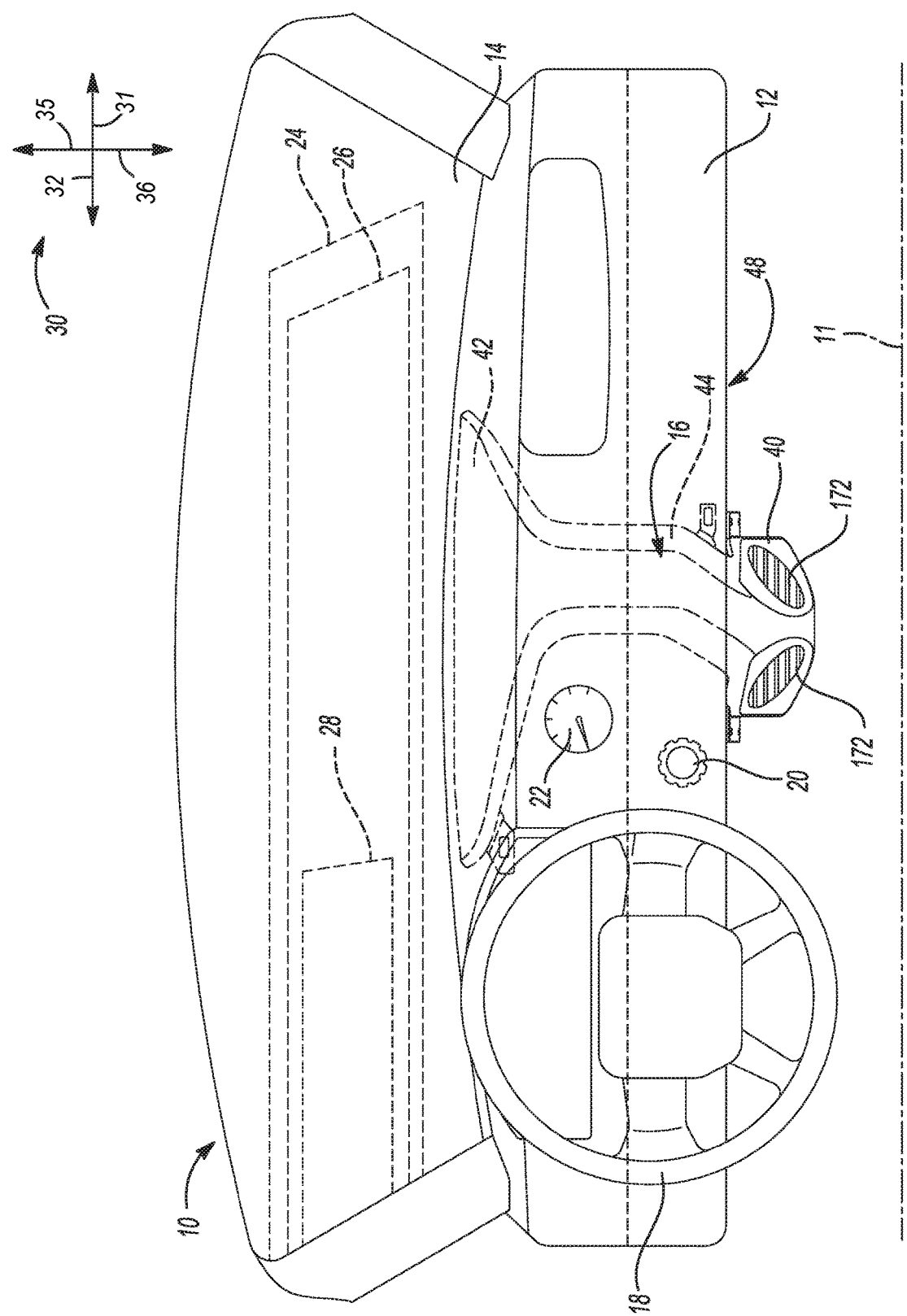
FIG. 1 is a partial schematic view of a passenger cabin of a vehicle including an instrument panel, a windshield, and a heater duct assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Vehicles may be generally equipped with vents to direct air, such as heated air, to one or more portions of a passenger cabin. However, some vehicles exclude traditional HVAC systems. Moreover, certain types of vehicles are compact and lack adequate space for concealed heating and cooling ducts. These types of vehicles may nonetheless benefit from heating and/or cooling. For example, vehicles that will be used in cooler climates may benefit from a defrost systems.

In various aspects, the present disclosure provides an external heater duct assembly that projects into a passenger cabin to direct heated air toward a windshield. The heater duct assembly may receive heat from an aftermarket heater, rather than an HVAC system. The heater duct assembly may also be referred to as a defrost duct assembly. In certain aspects, the heater duct assembly also includes one or more vents that can be opened to deflect at least a portion of the air toward other areas of the passenger cabin, such as toward a passenger's foot region or torso region.

With reference to FIG. 1, a portion of a passenger cabin 10 of a vehicle is provided. The vehicle is adapted to travel along a surface 11. In various aspects, the vehicle may be a 4×4 side-by-side seating, recreation vehicle, such as a utility task vehicle (UTV). The passenger cabin 10 may include an instrument panel 12 and a windshield 14. Various components may be coupled to the instrument panel 12, such as a heater duct assembly 16 (also referred to as a "defroster duct assembly"), a steering wheel 18, an ignition 20, and a speedometer 22, by way of example. The heater duct assembly 16 may be adapted to direct air, such as from a heater 23 toward one or more target regions of the windshield 14, such as a first predetermined region 24, a second predetermined region 26, and a third predetermined region 28. Thus, the heater duct assembly 16 may be fluidly connected to the heater. In various aspects, the heater duct assembly 16 may be directly fluidly connected to the heater.

The heater duct assembly 16 may be positioned in an orthogonal coordinate system 30. The orthogonal coordinate system may include an x-axis, a y-axis extending perpendicular to the x-axis, and a z-axis extending perpendicular to the x-axis and the y-axis. The x-axis may extend in a positive x-direction 31 and a negative x-direction 32 opposite the positive x-direction 31. The y-axis may extend in a positive y-direction 33 and a negative y-direction 34 opposite the positive y-direction 33. The z-axis may extend in a positive z-direction 35 and a negative z-direction 36 opposite the positive z-direction 35.

In various aspects, the y-axis may extend longitudinally through the vehicle and substantially parallel to a direction of travel of the vehicle. The positive y-direction 33 may correspond to forward travel and the negative y-direction 34 may correspond to rearward travel. The z-axis may extend substantially perpendicular to the surface 11 on which the vehicle is adapted to travel, with the positive z-direction 35 corresponding to an upward direction and the negative z-direction 36 corresponding to a downward direction. The x-axis may extend transversely across the vehicle, substantially perpendicular to the x- and z-axes. Accordingly, in various aspects, the positive x-direction 31 may be referred to as a first transverse or cross-car direction, the negative x-direction 32 may be referred to as a second transverse or cross-car direction, the positive y-direction 33 may be referred to as a forward direction, the negative y-direction 34 may be referred to as a rearward direction, the positive z-axis 35 may be referred to as an upward direction, and the negative z-direction 36 may be referred to as a downward direction.

At least a portion of the heater duct assembly 16 may be disposed in the negative z-direction 36 with respect to the instrument panel 12. At least a portion of the heater duct assembly 16 is disposed in the negative y-direction 33 with respect to the instrument panel 12. Accordingly, at least a portion of the heater duct assembly 16 may project into the passenger cabin 10. The heater duct assembly 16 may therefore be visible from within the passenger cabin. The heater duct assembly 16 may be disposed laterally between two vehicle seats (not shown). An appearance of the heater duct assembly 16 may be selected to coordinate with vehicle aesthetics. In various aspects, the heater duct assembly 16 may have an appearance of a deep water fording snorkel.

With reference to FIGS. 2-5, the heater duct assembly 16 may include a duct 38. The duct 38 may include a base 40, a nozzle 42, and a neck 44. The base 40, the nozzle 42, and the neck 44 may cooperate to define an interior volume 45 (FIG. 4) through which air may flow. When the heater duct assembly 16 is coupled to the heater, the neck 44 may be disposed downstream of the base 40, and the nozzle 42 may be disposed downstream of the neck 44.

The base 40 may be fluidly connected to the heater 23. The nozzle 42 may be adapted to direct air from the heater toward one or more predetermined regions (e.g., first, second, and or third predetermined regions 24, 26, 28, shown in FIG. 1) of the windshield 14. The neck 44 may extend between the base 40 and the nozzle 42 to fluidly connect the base 40 and the nozzle 42. Although the heater duct assembly 16 is described in the context of the heater, in alternative aspects, it may be connected to different or additional components to direct heated, ambient, or cooled air to at least a portion of the windshield 14 and/or passenger cabin 10.

The base 40 may include a first or floor portion 46 and a second or proximal wall portion 47. The floor portion 46 may be adapted to be sealingly coupled to an underside 48 of the instrument panel 12 (FIG. 1). The base 40, and more particularly the proximal wall portion 47, may be disposed in the negative z-direction 36 with respect to the instrument panel 12. The proximal wall portion 47 may be sized and shaped to deflect at least a portion of the air, which may be substantially all of the air, into the neck 44. The proximal wall portion 47 may define a convex shape with respect to the interior volume 45. For example, the proximal wall portion 47 may define a bowl shape.

The floor portion 46 may define an inlet opening 50. The inlet opening 50 may be adapted to receive air from the heater. In various aspects, the inlet opening 50 may define a rectangular shape having rounded corners. The inlet opening 50 may be adapted to be aligned with a heater outlet in the underside 48 of the instrument panel 12 to receive air from the heater. A first or base axis 52 (FIGS. 4-5) may extend through a center of the inlet opening 50. The inlet opening 50 may receive at least a portion of the air in the negative z-direction 36 (e.g., the downward direction).

The floor portion 46 may engage the underside 48 of the instrument panel 12 when the heater duct assembly 16 is coupled to the instrument panel 12. Accordingly, the floor 46 may be shaped to complement the underside 48 of the instrument panel 12. In various aspects, the floor 46 may be substantially planar. A rib 56 (FIGS. 3-4) may project from the floor portion 46 in the positive z-direction 35. The rib 56 may extend around the inlet opening 50. The rib 56 may facilitate alignment of the inlet opening 50 with an outlet of the heater during assembly of the heater duct assembly 16 to the instrument panel 12. The heater duct assembly 16 may further include a sealing component, such as a gasket, adapted to be disposed between the floor 46 and the underside 48 of the instrument panel 12 to fluidly seal the duct 38 to the instrument panel 12. In various aspects, the seal may be retained, at least in part, by the rib 56.

The neck 44 may generally extend in the positive z-direction 35 (e.g., the upward direction) from the base 40. The neck 44 may extend from a back end 60 of the base 40. At least a portion of the neck 44 may be disposed in the negative y-direction 34 with respect to the instrument panel 12. In various aspects, at least a portion of the neck 44 may be spaced apart from the instrument panel 12 to define a gap.

Figure 4:
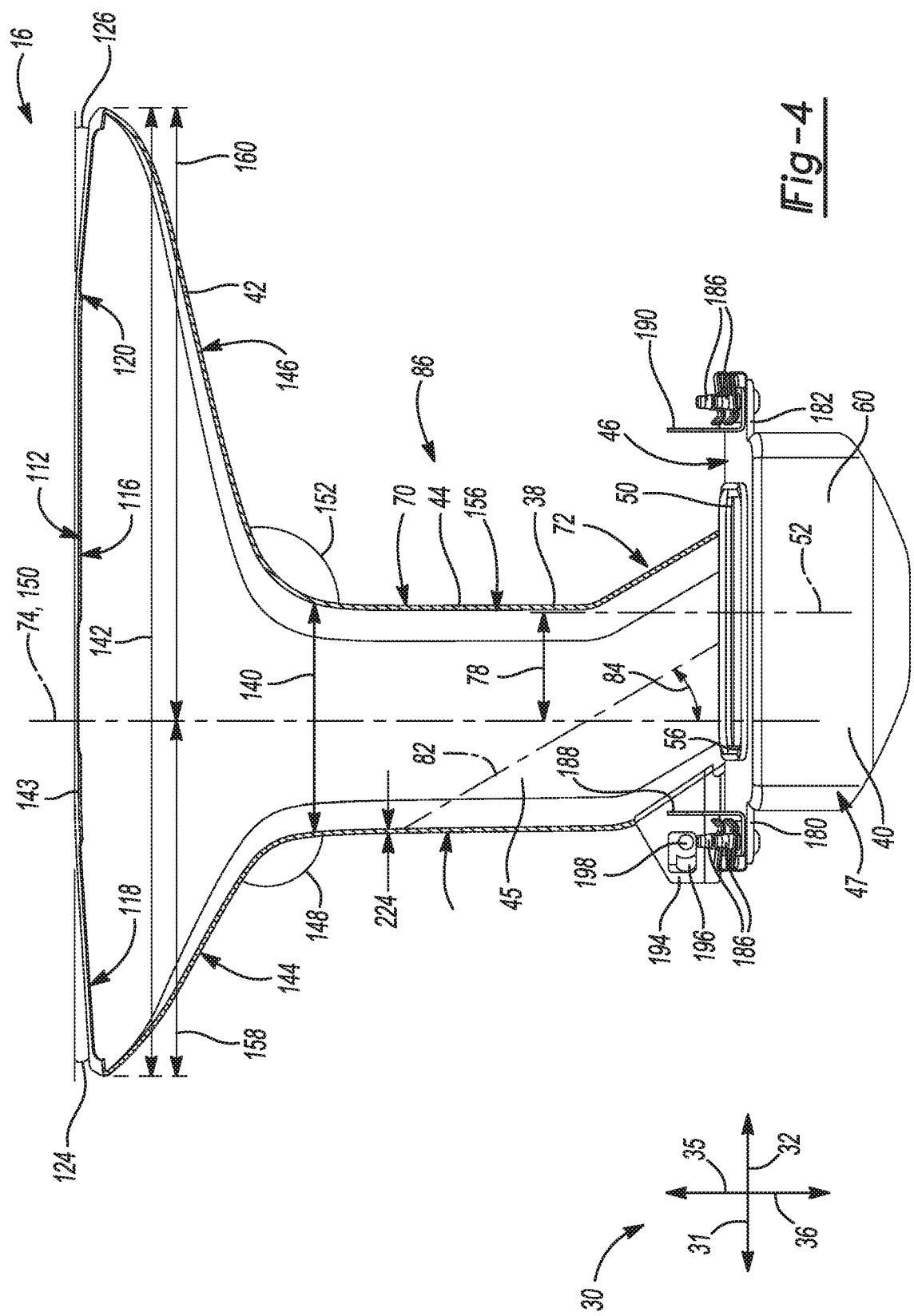
FIG. 4 is a sectional view of the heater duct assembly of FIG. 1.
Figure 5:
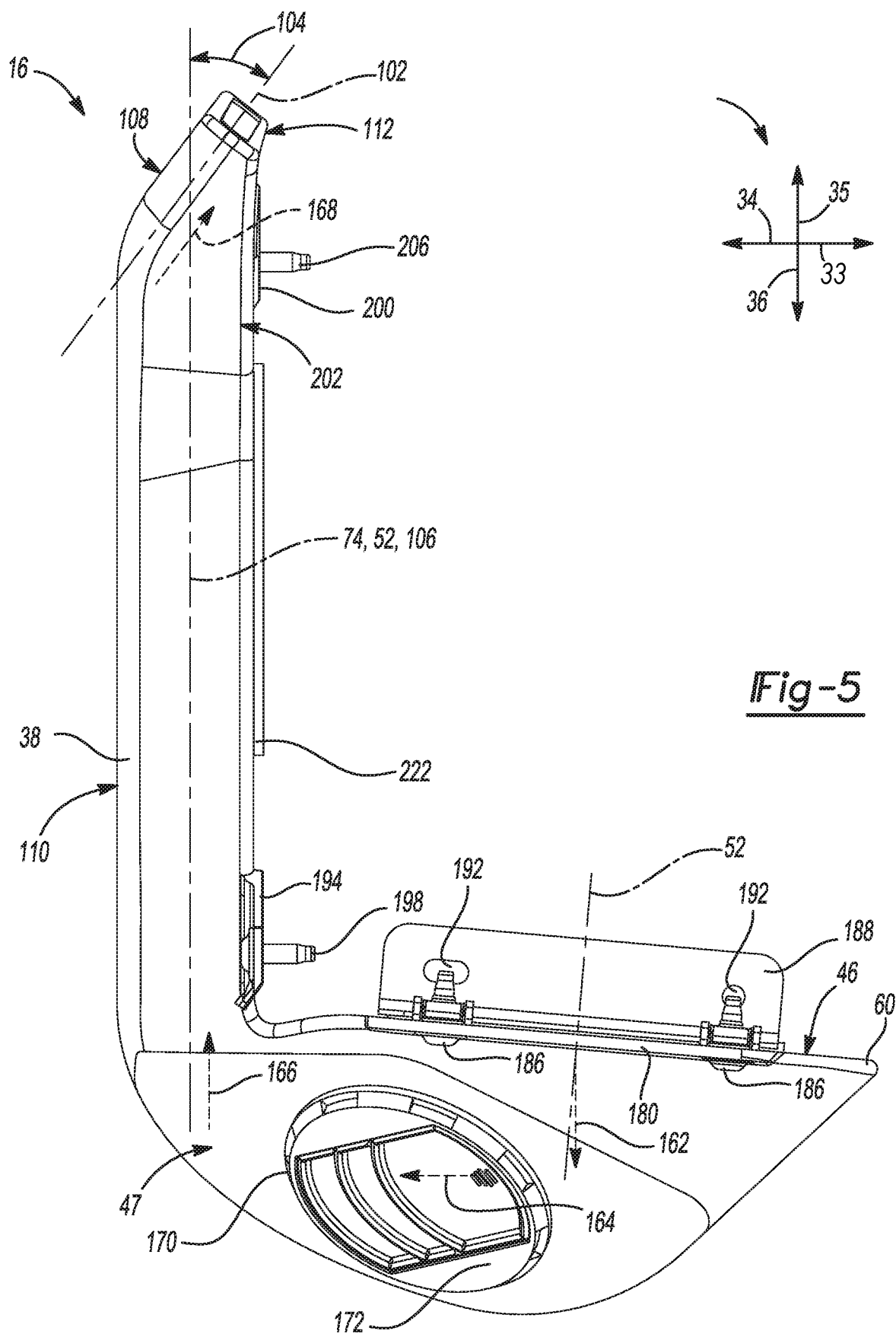
FIG. 5 is a side view of the heater duct assembly of FIG. 1.

The neck 44 may include a main portion 70 and a connecting portion 72. The main portion 70 may be disposed downstream of the connecting portion 72 when the heater duct assembly 16 is connected to the heater. A second or main axis 74 may extend longitudinally through a center of the main portion 70. In various aspects, the main axis 74 extends substantially parallel to the z-axis (i.e., the positive and negative z-directions 35, 36). The main axis 74 may be offset from the base axis 52 in both the positive x-direction 31 (FIG. 4) and the negative y-direction 34. As shown in FIG. 4, the main axis 74 may be offset from the base axis 52 by a first amount 78 in the positive x-direction 31. As shown in FIG. 5, the main axis 74 may extend non-parallel to the base axis 52. The base axis 52 may be disposed in the positive y-direction 33 with respect to the main axis 74.

With reference to FIG. 4, the connecting portion 72 may extend between the base 40 and the main portion 70 of the neck 44. The connecting portion 72 may extend from the base 40 in generally the positive x- and positive z-directions 31, 35. A third or connecting axis 82 may extend through a center of the connecting portion 72. The connecting axis 82 may be substantially aligned with the main axis 74 along the y-axis (i.e., parallel to the positive and negative y-directions 33, 34) (FIG. 5). The connecting axis 82 may form a first angle 84 with the main axis 74 and the base axis 52. In various aspects, a magnitude of the first angle 84 may be greater than 0° to less than or equal to about 90°, optionally greater than or equal to about 15° to less than or equal to about 45°, and optionally about 30°.

The connecting portion 72, and more particularly the offset 78 between the main axis 74 and the base axis 52 in the positive x-direction 31, may at least partially define an open region 86 adjacent to the neck 44. The open region 86 may facilitate visibility of, or access to, other components on the instrument panel 12, such as the speedometer 22 (FIG. 1). Thus the neck 44 may be sized and shaped to accommodate various vehicle packaging requirements. In various alternative aspects, the neck 44 may define different or additional curves, bends, or angles. In one example, the neck 44 may be straight such that a neck axis is substantially aligned with a base axis (not shown).

The main portion 70 of the neck 44 may define a substantially rectangular cross section having rounded corners in a direction substantially perpendicular to the main axis 74. The connecting portion 72 may define a substantially rectangular cross section having rounded corners in a direction substantially perpendicular to the connecting axis 82. However, in various alternative aspects, the main and connecting portions 70, 72 may define different cross-sectional shapes, such as ovals, triangles, or hexagons, by way of example.

The nozzle 42 may extend from the main portion 70 of the neck 44. The nozzle 42 may be sized and shaped to direct the air from the heater toward the windshield 14, thereby providing a defrost functionality. For example, the nozzle 42 may be angled toward the windshield 14 to direct the air at the first predetermined region 24, the second predetermined region 26, and/or the third predetermined region 28 (FIG. 1). Thus the nozzle 42 may be angled in both the positive z-direction 35 and the positive y-direction 33 (FIG. 5) with respect to the neck 44.

With reference to FIG. 5, the nozzle 42 may be adapted to direct at least a portion of the air, which may be substantially all of the air, along a nozzle plane 102 (FIG. 5). The nozzle plane 102 may be disposed at a second angle 104 with respect to a transverse neck plane 106 that extends generally along the y-axis (i.e., parallel to the positive and negative y-directions 33, 34) and includes the main axis 74 and the connecting axis 82. A magnitude of the second angle 104 may be selected based on the shape, size, and/or location of the first, second, and/or third predetermined regions 24, 26, 28 of the windshield 14 (FIG. 1). In various aspects, the magnitude of the second angle 104 may be greater than 0° to less than 90°, optionally greater than or equal to about 20° to less than or equal to about 50°, and optionally about 35°. The nozzle 42 may include a third or rear nozzle wall portion 108 that is disposed at the second angle 104 with respect to a fourth or rear neck wall portion 110.

Figure 3:
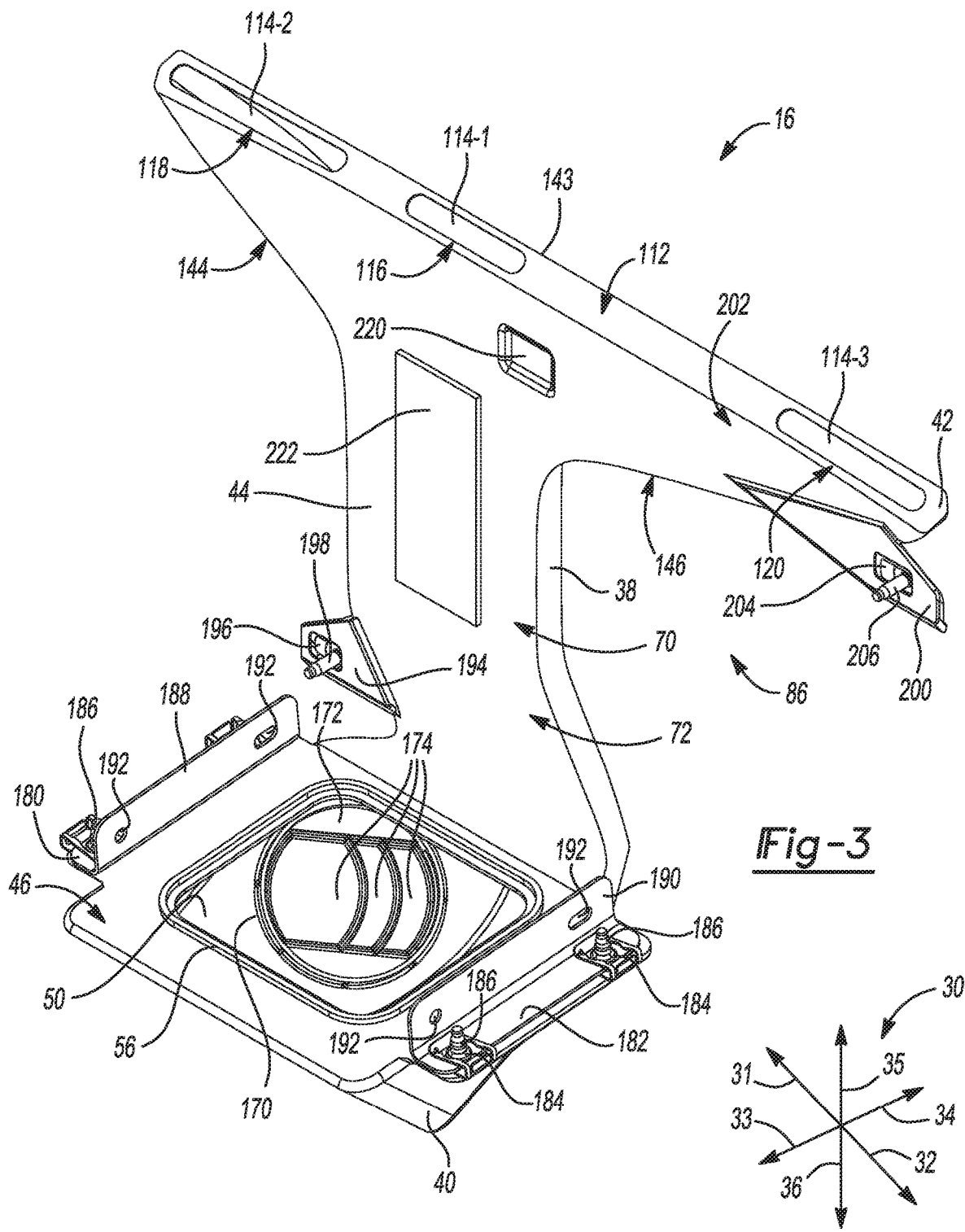
FIG. 3 is another perspective view of the heater duct assembly of FIG. 1.

Referring to FIG. 3, the nozzle 42 may further include a fifth or distal wall portion 112. The distal wall portion 112 may define a plurality of outlet openings. The plurality of outlet openings may include a first outlet opening 114-1, a second outlet opening 114-2, and a third outlet opening 114-3. The first outlet opening 114-1 may be disposed at least partially on a first or center sub-portion 116 of the distal wall portion 112. The second outlet opening 114-2 may be disposed at least partially on a second sub-portion 118 of the distal wall portion 112. The third outlet opening 114-3 may be disposed at least partially on a third sub-portion 120 of the distal wall portion 112. The second sub-portion 118 of the distal wall portion 112 may be disposed in the positive x-direction 31 with respect to the first sub-portion 116. The third sub-portion 120 of the distal wall portion 112 may be disposed in the negative x-direction 32 with respect to the first sub-portion 116.

With reference to FIG. 4, the first, second, and third sub-portions 116, 118, 120 of the distal wall portion 112 may be positioned to deflect the air through the respective first, second, and third outlet openings 114-1, 114-2, 114-3 and toward the windshield 14 (e.g., the first, second, and third predetermined regions 24, 26, 28). The second sub-portion 118 may extend in the negative z-direction 36 and the positive x-direction 31 with respect to the first sub-portion 116. The second sub-portion 118 may form a third angle 124 with the first sub-portion 116. The third sub-portion 120 may extend in the negative z-direction 36 and the negative x-direction 32 with respect to the first sub-portion 116. The third sub-portion 120 may form a fourth angle 126 with the first sub-portion 116.

Magnitudes of the third and fourth angles 124, 126 may be based on the shape, size, and/or location of the first, second, and third predetermined regions 24, 26, 28. In various aspects, the third angle 124 may be greater than 0° and less than or equal to 45°, optionally greater than or equal to about 1° to less than or equal to about 5°, and optionally greater than or equal to about 2° to less than or equal to about 3°. The fourth angle 126 may be greater than 0° and less than or equal to 45°, optionally greater than or equal to about 1° to less than or equal to about 5°, and optionally greater than or equal to about 2° to less than or equal to about 3°. Magnitudes of the third and fourth angles 124, 126 may be the same or different.

The nozzle 42 may be tapered such that a transverse dimension of the nozzle 42 (i.e., along the x-axis at least partially defined by the positive and negative x-axes 31, 32) increases in the positive z-direction 35. Thus, the nozzle 42 may define a first dimension 140 adjacent to the neck 44 and a second dimension 142 at a distal 143 of the nozzle 42 (i.e., adjacent to the distal wall portion 112 and the first, second, and third outlet openings 114-1, 114-2, 114-3). The second dimension 142 may be greater than the first dimension 140. Accordingly, the transverse of the nozzle 42 may increase in a direction of air flow so that the second dimension 142 is disposed downstream of the first dimension 140.

The nozzle 42 may include a sixth wall portion 144 (also referred to as the first angled nozzle wall portion 144) and a seventh wall portion 146 (also referred to as the second angled nozzle wall portion 146). Each of the first and second angled nozzle wall portions 144, 146 may extend between the main portion 70 of the neck 44 and the distal wall portion 112. The first angled nozzle wall portion 144 may be disposed opposite the second angled nozzle wall portion 146.

The first angled wall portion 144 may extend from the main portion 70 of the neck 44 in generally the positive x- and positive z-directions 31, 35. The first angled nozzle wall portion 144 may form a fifth angle 148 with a main neck plane 150 that extends through the main axis 74 in the positive and negative y-directions 33, 34. In various aspects, the fifth angle 148 may have a fifth magnitude of greater than 90° and less than 180°, optionally greater than or equal to about 110° and less than or equal to about 150°, and optionally about 130°.

The second angled wall portion 146 may extend from the main portion 70 of the neck 44 in generally the negative x- and positive z-directions 32, 35. The second angled nozzle wall portion 146 may form a sixth angle 152 with the main nozzle plane 150. In various aspects, the sixth angle 152 may have a sixth magnitude of greater than 90° and less than 180°, optionally greater than or equal to about 95° and less than or equal to about 135°, and optionally about 115°. The first and second angled nozzle wall portions 144, 146 may also form the respective fifth and sixth angles 148, 152 with respective eighth and ninth wall portions 154, 156 (also referred to as first and second neck wall portions 154, 156). The magnitudes of the fifth and sixth angles 148, 152 may be the same or different.

The nozzle 42 may be bilaterally asymmetric to provide even defrosting of the windshield 14 while accommodating the open region 86. More particularly, the nozzle 42 may be asymmetric about the main neck plane 150. The nozzle 42 may define a third dimension 158 in the positive x-direction 31 from the main neck plane 150 and a fourth dimension 160 in the negative x-direction 32 from the main neck plane 150. The fourth dimension 160 may be different than the third dimension 158. For example, the fourth dimension 160 may be greater than the third dimension 158.

As described above, the heater duct assembly 16 may be fluidly coupled to the heater to receive air form the heater. A first portion 162 of the air (e.g., in a first region of the interior volume 45) may be directed in substantially the negative z-direction 36. A second portion 164 of the air (e.g., in a second region of the interior volume 45 downstream of the first region) may be directed in substantially the negative y-direction 34. A third portion 166 of the air (e.g., in a third region of the interior volume 45 downstream of the second region) may be directed in substantially the positive z-direction 35. A fourth portion 168 of the air (e.g., in a fourth region of the interior volume 45 downstream of the third region) may be directed in substantially the positive y- and z-directions 33, 35 (e.g., along the nozzle plane 102).

Returning to FIGS. 2-3, the base 40 of the duct 38 may define one or more openings 170, also referred to as "vent openings." For example, the proximal wall portion 47 of the base 40 may include two diametrically-opposed openings 170. The heater duct assembly 16 may further include vents 172 disposed in the respective openings 170. The vents 172 may be disposed downstream of the inlet opening 50. The nozzle 42 may be disposed downstream of the vents 172.

Figure 2:
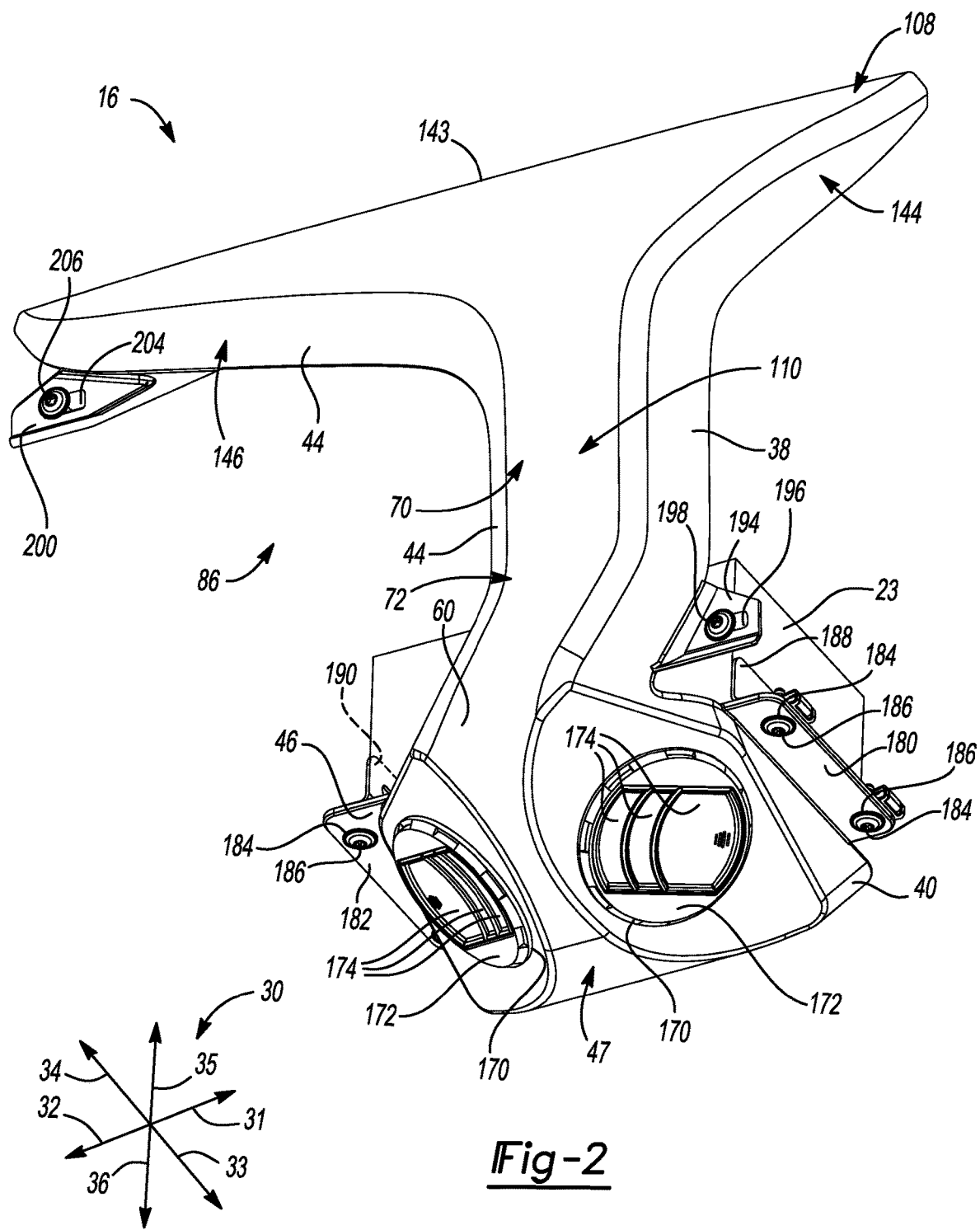
FIG. 2 is a perspective view of the heater duct assembly of FIG. 1.

The vents 172 may be diametrically opposed. The vents 172 may be adapted to be moved between a first or fully-open configuration (not shown) and a second or fully-closed configuration (FIG. 2). In the fully-open configuration, at least a portion of the air, which may be substantially all of the air, is deflected out of the vents 172 rather than through the neck 44 and out of the nozzle 42. In the fully closed configuration, substantially all of the air is directed through the neck 44 and out of the nozzle 42.

The vents 172 may be configured to be manually transitioned between the fully-open configuration and the fully closed configuration by a user. For example, the user may rotate or slide slats 174 of the vents 172 to change the configuration. In various alternative aspects, the vents 172 may be electronically controlled to move between the fully-open and fully-closed configurations.

In various aspects, the vents 172 may be movable between more than two configurations. In one example, the vents 172 are movable to one or more discrete partially-open configurations, so that a portion of the air is directed out of the vents 172 and another portion of the air is directed through the neck 44 and out the nozzle 42. In another example, the vents 172 are continuously movable between the fully-open configuration and the fully-closed configuration so that a user can control the amount of air that flows through the vent 172. Additionally, the vents 172 may be adjustable with respect to an air flow direction (e.g., toward a passenger's feet, torso, or head).

A heater duct assembly may be provided with other quantities of vent openings and respective vents. In one example, a heater duct assembly includes a single vent adapted to direct air toward a driver (not shown). In other examples, a heater duct assembly includes three, four, five, or six vents (not shown). Vents may also be provided in different or additional locations.

As shown in FIG. 1 and described above, the heater duct assembly 16 may be coupled to the instrument panel 12. In various aspects, the heater duct assembly 16 may be removably coupled to the instrument panel 12. The heater duct assembly 16 may be readily assembled to the instrument panel 12 or removed from the instrument panel 12 by a user. For example, the user may wish to install the heater duct assembly 16 for seasonal use (e.g., during cold weather when defrost may be useful), and remove the heater duct assembly 16 when it is not needed to increase space in the passenger cabin 10 of the vehicle.

The heater duct assembly 16 may therefore include one or more mechanical features adapted to removably couple the heater duct assembly 16 to the instrument panel 12. With renewed reference to FIGS. 2-3, the base 40 may include a first flange 180 and a second flange 182. The first flange 180 may extend from the floor 46 in the positive x-direction 31. The second flange 182 may extend form the floor 46 in the negative x-direction 32. The first and second flanges 180, 182 may be coplanar with the floor 46. Each of the first and second flanges 180, 182 may define one or more first apertures 184 adapted to receive respective first fasteners 186.

The base 40 may further include a third flange 188 and a fourth flange 190. The third flange 188 may extend in the positive z-direction 35 from the floor 46 or the first flange 180. The fourth flange 190 may extend in the positive z-direction 35 from the floor 46 or the second flange 182. Each of the third and fourth flanges 188, 190 may include one or more second apertures 192 adapted to receive respective second fasteners (not shown).

The neck 44 may include a fifth flange 194. The fifth flange 194 may extend from the connecting portion 72 of the neck 44 in the positive x-direction 31. The fifth flange 194 may define a third aperture 196 configured to receive a third fastener 198. The nozzle 42 may include a sixth flange 200. The sixth flange 200 may extend from a front nozzle wall portion 202 in the negative x-direction 32. The sixth flange 200 may define a fourth aperture 204 adapted to receive a fourth fastener 206. The fifth and sixth flanges 194, 200 may be disposed on opposing sides of the duct 38.

The first, second, third, and/or fourth fasteners 186, 198, 206 may be used to removably couple the heater duct assembly 16 to the instrument panel 12. In various aspects, at least a portion of the first, second, third, and fourth apertures 184, 192, 196, 204 may be slots. In various aspects, the heater duct assembly 16 may include different or additional types of mechanical fasteners. For example, the heater duct assembly 16 may include hook and loop fastener (e.g., 3M DUAL LOCK™), with one of the hook portion and the loop portion being disposed on the floor 46 and the other of the hook portion and the loop portion being disposed on the underside 48 of the instrument panel 12.

The duct 38 may further include raised or depressed features for packaging, structure, or aesthetics. With reference to FIG. 3, the nozzle 42 may define a depression 220. The depression 220 may accommodate a protrusion, such as a screw, on the instrument panel 12. The neck 44 may define a protrusion 222. The protrusion 222 may define a substantially rectangular shape. In various aspects, the duct 38 may include different or additional raised or depressed features.

The duct 38 may be formed from a thermoplastic or thermoset polymer. In one example, the duct 38 is formed from acrylonitrile butadiene styrene ("ABS"). In various aspects, the duct 38 may define a wall thickness of greater than or equal to about 1 mm to less than or equal to about 5 mm, optionally greater than or equal to about 2 mm to less than or equal to about 3 mm, and optionally about 2.5 mm.

In various aspects, the duct 38 may have a unitary or single-piece structure that is free from seams. The duct 38 having the unitary structure may be formed by blow molding, by way of example. Thus, the duct 38 may be formed from a single peripheral wall, also referred to as a common wall. The single peripheral wall may include the floor, proximal, rear nozzle, rear neck, distal, first angled nozzle, second angled nozzle, first neck, second neck, and front nozzle wall portions 46, 47, 108, 110, 112, 144, 146, 154, 156, 202. The base 40, the nozzle 42, and the neck 44 may therefore share the common wall. It is contemplated that the common wall includes a substantially constant thickness.

In various alternative aspects, the duct 38 may have a two-piece structure. A two-piece duct may include first and second components that are coupled to one another at one or more seams (not shown) to at least partially define the interior volume 45. The seams may be fluid tight. In one example, at least a portion of the seams may be disposed on a front of the duct 38 (i.e., facing the instrument panel), such that it is hidden from view of the occupants of the vehicle. The first and second components may be formed by vacuum forming, by way of example. The duct 38 may alternatively comprise different or additional components. For example, each of the base 40, nozzle 42, and neck 44 may be separate components that are coupled to one another to form the duct 38 and define the interior volume 45.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heater duct adapted to be coupled to an instrument panel of a vehicle, the heater duct comprising:
    a base including an inlet opening adapted to receive air from a heater, the base adapted to be sealingly coupled to the instrument panel;
    a nozzle including an outlet opening, the nozzle being fluidly connected to the base and adapted to deflect the air through the outlet opening and toward a predetermined region of a windshield;
    a neck extending between the base and the nozzle, the neck being sealingly coupled to the base and the nozzle; the base, the nozzle, and the neck cooperating to at least partially define an interior volume, wherein the heater duct is positioned in an orthogonal coordinate system comprising an x-axis, a y-axis, and a z-axis, wherein the air flowing from the inlet opening through the interior volume and toward the outlet opening follows a path sequentially extending in substantially a negative z-direction, substantially a negative y-direction, and substantially a positive z-direction; and
    wherein the base further includes a vent opening, the vent opening being adapted to receive at least a portion of the air.

2. The heater duct of claim 1, wherein the nozzle is tapered between a first dimension adjacent to the neck and a second dimension adjacent to the outlet opening, the second dimension being greater than the first dimension.

3. The heater duct of claim 1, wherein the vent opening comprises a pair of vent openings.

4. The heater duct of claim 1, wherein at least a portion of the base is disposed in the negative z-direction with respect to the instrument panel, and at least a portion of the neck is disposed in the negative y-direction with respect to the instrument panel.

5. The heater duct of claim 1, wherein the heater duct is adapted to be removably coupled to the instrument panel.

6. The heater duct of claim 1, wherein the base, the nozzle, and the neck are integrally formed.

7. The heater duct of claim 1, wherein the base, the nozzle, and the neck share a common wall, the common wall having a substantially uniform thickness of greater than or equal to about 2 mm to less than or equal to about 3 mm, and the common wall comprising acrylonitrile butadiene styrene.

8. The heater duct of claim 1, wherein the y-axis is adapted to extend parallel to a direction of forward travel of the vehicle and the z-axis is adapted to extend perpendicular to a surface upon which the vehicle is adapted to travel.

9. The heater duct of claim 1, wherein the path continues along the positive z-direction and a positive y-direction.

10. A heater duct adapted to be coupled to an instrument panel of a vehicle, the heater duct comprising:
    a base including an inlet opening adapted to receive air from a heater, the base adapted to be sealingly coupled to the instrument panel;
    a nozzle including an outlet opening, the nozzle being fluidly connected to the base and adapted to deflect the air through the outlet opening and toward a predetermined region of a windshield; and
    a neck extending between the base and the nozzle, the neck being sealingly coupled to the base and the nozzle; the base, the nozzle, and the neck cooperating to at least partially define an interior volume, wherein the heater duct is positioned in an orthogonal coordinate system comprising an x-axis, a y-axis, and a z-axis, wherein air flowing from the inlet opening through the interior volume and toward the outlet opening follows a path sequentially extending in substantially a negative z-direction, substantially a negative y-direction, and substantially a positive z-direction, wherein the neck includes a main portion having a main axis extending therethrough, and a connecting portion having a connecting axis extending therethrough, the main axis and the connecting axis extending nonparallel to one another.

11. The heater duct of claim 10, wherein a base axis extends through a center of the inlet opening, the base axis being offset from the main axis in a positive x-direction.

12. The heater duct of claim 11, wherein the main portion is disposed downstream of the connecting portion.

13. The heater duct of claim 10, wherein the nozzle is bilaterally asymmetric.

14. A heater duct assembly adapted to be coupled to an instrument panel of a vehicle, the heater duct assembly comprising:
    a duct including,
        a base including an inlet opening adapted to receive air from a heater, the base being adapted to be sealingly coupled to the instrument panel,
        a nozzle including an outlet opening, the nozzle being fluidly connected to the base and adapted to deflect the air through the outlet opening and toward a predetermined region of a windshield, and a neck extending between the base and the nozzle, the neck being sealingly coupled to the base and the nozzle; the base, the nozzle, and the neck cooperating to at least partially define an interior volume; and a vent disposed within a vent opening and coupled to the base, the vent being disposed downstream of the inlet opening, positioned on an opposite end of the neck as the nozzle, and adapted to receive at least a portion of the air, the nozzle being disposed downstream of the vent.

15. The heater duct assembly of claim 14, wherein:

the vent is adapted to be moved between a fully-open configuration and a fully-closed configuration;

in the fully-open configuration, the vent receives at least a portion of the air; and in the fully-closed configuration, the nozzle receives substantially all of the air.

16. The heater duct assembly of claim 15, wherein the vent is continuously adjustable between the fully-open configuration and the fully-closed configuration.

17. The heater duct assembly of claim 14, wherein the vent comprises a pair of vents.

18. The heater duct assembly of claim 14, wherein a position of the vent is adjustable to control a flow direction of the at least a portion of the air.

* * * * *